US010500802B2

(12) United States Patent
Conti (10) Patent No.: US 10,500,802 B2
(45) Date of Patent: Dec. 10, 2019

(54) TYRE BUILDING PLANT AND METHOD FOR SUPPLYING AN ELONGATED ELEMENT TO A FORMING DRUM IN A TYRE BUILDING PLANT

(71) Applicant: PIRELLI TYRE S.P.A., Milan (IT)

(72) Inventor: Davide Conti, Milan (IT)

(73) Assignee: PIRELLI TYRE S.p.A., Milan (IT)

(*) Notice: Subject to any disclaimer, the term of this patent is extended or adjusted under 35 U.S.C. 154(b) by 40 days.

(21) Appl. No.: 15/537,177

(22) PCT Filed: Nov. 27, 2015

(86) PCT No.: PCT/IB2015/059163
§ 371 (c)(1),
(2) Date: Jun. 16, 2017

(87) PCT Pub. No.: WO2016/103078
PCT Pub. Date: Jun. 30, 2016

(65) Prior Publication Data
US 2018/0036976 A1 Feb. 8, 2018

(30) Foreign Application Priority Data
Dec. 24, 2014 (IT) .............. PD2014A0363

(51) Int. Cl.
*B29D 30/00* (2006.01)
*B29D 30/44* (2006.01)
*B29D 30/46* (2006.01)

(52) U.S. Cl.
CPC ......... *B29D 30/0016* (2013.01); *B29D 30/44* (2013.01); *B29D 30/46* (2013.01);
(Continued)

(58) Field of Classification Search
CPC .... B29D 30/0016; B29D 30/44; B29D 30/46; B29D 2030/0038; B29D 2030/4425; B65H 2301/44322; B65H 2801/93
(Continued)

(56) References Cited

U.S. PATENT DOCUMENTS

| 3,108,032 A | 10/1963 | Carlson |
| 4,781,317 A | 11/1988 | Ditto |

(Continued)

FOREIGN PATENT DOCUMENTS

| EP | 0 671 255 | 9/1995 |
| EP | 0 835 747 | 4/1998 |

(Continued)

OTHER PUBLICATIONS

International Search Report from the European Patent Office for International Application No. PCT/IB2015/059163, dated Mar. 31, 2016.
(Continued)

*Primary Examiner* — George R Koch
(74) *Attorney, Agent, or Firm* — Finnegan, Henderson, Farabow, Garrett & Dunner, L.L.P.

(57) ABSTRACT

A tyre building plant includes a forming drum and a supply device for supplying an elongated element toward the forming drum. The supply device includes at least one conveyor belt which extends in a supply direction between a loading region, in which the elongated element is loaded on the conveyor belt and an unloading region, a control unit for controlling the loading of the elongated element on the conveyor belt, at least a first detection element which is fixed with a first portion of the conveyor belt, a sensor which is fixed and independent with respect to the conveyor belt and which detects the position of the first portion with respect to the supply device. The loading of the elongated element on the conveyor belt is performed when the first portion is at a predefined reference distance from the loading region.

17 Claims, 2 Drawing Sheets

(52) U.S. Cl.
CPC ........... *B29D 2030/0038* (2013.01); *B29D 2030/4425* (2013.01); *B65H 2301/44322* (2013.01); *B65H 2801/93* (2013.01)

(58) Field of Classification Search
USPC .......................................................... 156/64
See application file for complete search history.

(56) References Cited

U.S. PATENT DOCUMENTS

| | | |
|---|---|---|
| 5,582,664 A | 12/1996 | Sergel et al. |
| 6,547,906 B1 | 4/2003 | Kolker et al. |
| 2003/0019725 A1 | 1/2003 | Hoffmann |
| 2003/0066610 A1 | 4/2003 | Kolker et al. |
| 2013/0160930 A1 | 6/2013 | Stoila et al. |

FOREIGN PATENT DOCUMENTS

| | | |
|---|---|---|
| JP | 2-151426 | 6/1990 |
| WO | WO 88/03119 | 5/1988 |
| WO | WO 2013/093765 | 6/2013 |

OTHER PUBLICATIONS

Written Opinion of the International Searching Authority from the European Patent Office for International Application No. PCT/IB2015/059163, dated Mar. 31, 2016.

TYRE BUILDING PLANT AND METHOD FOR SUPPLYING AN ELONGATED ELEMENT TO A FORMING DRUM IN A TYRE BUILDING PLANT

CROSS REFERENCE TO RELATED APPLICATIONS

This application is a national phase application based on PCT/IB2015/059163, filed Nov. 27, 2015, and claims the priority of Italian Patent Application No. PD2014A000363, filed Dec. 24, 2014, the content of each application being incorporated herein by reference.

BACKGROUND OF THE INVENTION

Field of the Invention

The present invention relates to a tyre building plant in which an elongated element is supplied to a forming drum by means of a supply device including a conveyor belt.

The invention further relates to a method for supplying an elongated element to a forming drum in a tyre building plant.

Description of the Related Art

A tyre generally comprises a carcass structure which is torically formed about an axis of rotation and which includes at least one carcass ply which has axially opposing end flaps which engage in respective annular anchoring structures, generally known as "bead cores", which are integrated in the zones usually identified as "beads".

In a radially external position with respect to the carcass structure, there is provided a belt structure comprising one or more belt layers which are arranged with radial superimposition with respect to each other and with respect to the carcass structure.

The belt structure can further comprise, in a radially external position, at least at the ends of the belt strips below, a layer of textile or metal cords which are arranged circumferentially (at 0 degrees). In tyres of the tubeless type there is further provided a radially internal layer which is referred to as a liner and which has impermeability characteristics in order to ensure the air-tightness for the tyre itself.

In a radially external position with respect to the belt structure, there is applied a tread band which is produced from elastomer material and on which there is defined a tread pattern which is intended for contact with the road surface.

In an axially external position, respective sidewalls of elastomer material are further applied to the lateral surfaces of the carcass structure, each extending from one of the lateral edges of the tread band as far as a location at the respective annular anchoring structure for the beads.

A process for producing tyres provides for a first tyre building step, in which the various components of the tyre, including those set out above, are assembled in a building plant so as to obtain a so-called "green" tyre, and a subsequent moulding and vulcanizing step, where the green tyre is subjected, for a predetermined time period, to temperature and pressure values so as to vulcanize the elastomer material of the components thereof, obtaining the final structural stability of the tyre.

In greater detail, there are known processes in which the building step provides for the production of one or more structural components of the tyre by means of depositing one or more elongated elements on a cylindrical surface (which may be the external surface of a forming drum or the external surface of a semifinished product of the tyre which is already deposited on that forming drum) rotating about its own axis.

Those elongated elements are deposited on the forming drum by means of a supply device which is provided to take the elongated element in continuous form, for example, from a storage reel, cutting it to the desired measurement and, by means of a conveyor belt, dispensing it at a predetermined speed to the forming drum in a direction tangential to the external surface thereof.

US2013/0160930 discloses a method for applying a ply to a forming drum for building tyres. The method comprises the steps of receiving the sheet of flexible material on a conveyor belt of a transport table, in which the conveyor belt can move in translation in a direction X, and provides for a plurality of rollers which are mounted in a rotatable manner on the conveyor belt so that they can rotate with respect to an axis aligned with the direction X.

US2003/0019725 discloses a material guiding system with a conveyor belt type system on which a strip of belt reinforced with cords is transported as far as a specific cutting line, the transport system for the belt comprising a plurality of conveyor belts or groups of conveyor belts which can be controlled individually.

The term "elongated element" is intended to be understood to be an element having a longitudinal dimension which is prevalent with respect to the remaining dimensions. Preferably, said elongated element is constituted only by elastomer material or comprises elastomer material in which there are embedded additional structural elements.

Preferably, the elongated element is formed in a strip-like manner with a flattened cross-section. Preferably, the additional structural elements comprise one or more textile or metal reinforcement cords. Those reinforcement cords are preferably arranged parallel with each other and preferably extend in the longitudinal direction of the same elongated element.

The term "light radiation" is intended to be understood to be electromagnetic radiation having a frequency in the range corresponding to the regions of visible light, infrared and ultraviolet.

SUMMARY OF THE INVENTION

The Applicant has previously observed that an incorrect deposition of the elongated element on the forming drum may have relevant negative repercussions on the quality of the tyre built.

In particular, the Applicant has observed that a first reason of an incorrect deposition is constituted by incorrect relative positioning between the surface of the conveyor belt on which the elongated element is supported and the forming drum.

For this purpose, the Applicant has verified that the thickness of the conveyor belt is generally variable both over the longitudinal extent thereof and over the transverse dimension so that the relative distance between the conveyor belt and the cylindrical outer surface of the forming drum on which the elongated element has to be deposited is not constant. Consequently, while a section of the conveyor belt may be too near the surface of the forming drum, a different section of the same conveyor belt may be too far away.

The Applicant has further discovered that this disadvantage is further made worse if the forming drum is controlled by a pair of parallel conveyor belts on each of which an elongated element is deposited. In fact, in this case, typically used to form on the forming drum mutually symmetrical pairs of components of the tyre, such as, for example, the sidewalls or the sidewall inserts, in addition to the variation in thickness over the longitudinal extent of every single belt, it is necessary to consider the difference in thickness between the two belts in the region of the same longitudinal section.

The Applicant has further observed that a second reason of incorrect deposition of an elongated element on the forming drum is constituted by an imprecise length measurement of the elongated element supplied to the forming drum. The elongated element is cut to the desired length by a suitable cutting member which is controlled by a control unit which is connected to a sensor which detects the position of the elongated element while it is positioned on the conveyor belt.

As a result, an imprecise detection of the position of the elongated element involves cutting the elongated element to a length which is different from that desired.

The Applicant has verified that, among the different systems for detecting the position of an elongated element on the conveyor belt, a system which has provided better results is the optical detection system. That system comprises a light source and a detector for light radiation which is emitted by that source, which are positioned on the path of the elongated element in such a manner that the light radiation emitted by the source is interrupted by the passage of the elongated element. At the time at which the system records the passage of the elongated element, thereby establishing the position of a front end thereof, the conveyor belt is caused to advance so as to move that front end to a distance from the cutting member equal to the desired length and the cutting member is therefore actuated in order to cut the elongated element.

In the technical solutions of the type described in US 2003/0019725, the light source and the corresponding detector are positioned upstream of the conveyor belt.

However, the Applicant has verified that this solution has some disadvantages in terms of precision of the measurement of the elongated element, because the movement of the conveyor belt is generally subjected to errors, owing to imprecise dimensions in the pulling members of the conveyor belt or phenomena of slippage of the elongated element with respect to the conveyor belt, sometimes as a result of internal tensions with respect to the elongated element itself.

In order to overcome this disadvantage, the Applicant has positioned the optical detection system inside the conveyor belt so as to space it apart from the cutting member and to reduce to the greatest possible extent the measurement errors as a result of the movement of the belt after the detection of the position of the elongated element on the belt.

This result has been obtained by making the conveyor belt dual so that each elongated element is supplied to the forming drum by a pair of conveyor belts which are parallel with and spaced apart from each other so as to allow, in the space left free between the belts, the passage of the light radiation of an optical detection system.

However, the Applicant has verified that the control of an elongated element with a pair of conveyor belts involves additional relevant disadvantages, including, in addition to a general increase of the levels of complexity for constructing the plant and for maintaining it, the fact that it involves errors both of cutting precisely for the cutting operation and of depositing the elongated element on the forming drum, caused by differences in the control speed of the two conveyor belts which lead to phenomena of lateral deviation or increased phenomena of slippage of the elongated element on the conveyor belts arising from the reduction of the support surface thereof which is generally provided for the elongated element.

The Applicant has further established that not even the use of conveyor belts with dimensional tolerances which are reduced as much as possible is sufficient to ensure the correctness and repeatability over time of the deposition of an elongated element by means of a conveyor belt on the forming drum.

On the basis of those observations, the Applicant has perceived that the problem could be tackled adopting a different point of view, taking note of the inevitability of the presence of dimensional variations of the conveyor belt and the advance mechanism thereof, and acting so as to make those optional dimensional non-uniformities repeatable for each elongated element which is supplied to the forming drum.

The Applicant has therefore found that fixedly associating a detection element with a specific portion of the conveyor belt establishes a point of reference on the conveyor belt itself which allows the relative position of each other section of the belt to be established and, at the same time, also allows the position of a possible front end of an elongated element supported on the conveyor belt relative to that portion to be established.

In particular, in a first aspect thereof, the invention relates to a tyre building plant comprising a forming drum and a supply device for supplying an elongated element towards said forming drum.

Preferably, said supply device comprises at least one conveyor belt which extends in a supply direction between a loading region, in which said elongated element is loaded on said conveyor belt, and an unloading region, in which said elongated element is unloaded from said conveyor belt.

Preferably, said supply device comprises a motor member which is provided so as to move said at least one conveyor belt between said loading region and said unloading region.

Preferably, said supply device comprises a control unit which is provided to control the loading of said elongated element on said conveyor belt and the movement of said at least one conveyor belt.

Preferably, said supply device comprises at least a first detection element which is fixedly associated with a first portion of said at least one conveyor belt.

Preferably, said supply device comprises a sensor which is fixed and independent with respect to said at least one conveyor belt and which is provided to detect the position of said first portion with respect to said supply device.

Preferably, said control unit is provided to control the loading of said elongated element on said conveyor belt when said first portion is at a predefined reference distance from said loading region.

The Applicant has established that a building plant which is structured in this manner allows for a step of depositing the elongated element on the forming drum which is more precise with respect to a conventional plant, without for all that incurring an increase in production and control costs of the plant.

In particular, the characteristics of the building plant of the present invention allow supply of each elongated element in a repeatable manner, because each elongated element of equal length is supported at substantially all times on the same portion of conveyor belt.

In a second aspect thereof, the invention relates to a method for supplying, by means of a supply device including at least one conveyor belt, an elongated element to a forming drum in a tyre building plant.

Preferably, there is provision for fixedly associating at least one first detection element with a first portion of said at least one conveyor belt.

Preferably, there is provision for positioning, at a loading region of said supply device, a front end of said elongated element at a predefined reference distance from said first portion.

Preferably, there is provision for detecting the position of said first portion with respect to said supply device by means of the mutual interaction between said at least one first detection element and a sensor which is positioned on said supply device fixedly and independently with respect to said conveyor belt.

Preferably, there is provision for calculating, in accordance with the detected position of said first portion, the movement of said at least one conveyor belt which is necessary to bring said first portion to said reference distance from said loading region.

Preferably, there is provision for advancing said at least one conveyor belt towards an unloading region of said supply device until said elongated element is deposited at said forming drum.

Preferably, there is provision for bringing, in accordance with the calculated movement, said first portion of said at least one conveyor belt to said reference distance from said loading region.

Preferably, there is provision for positioning a front end of a successive elongated element on said conveyor belt.

The Applicant has verified that, as a result of this method, each elongated element is positioned substantially in the region of the same portion of the conveyor belt.

In this manner, it is simpler to control the position of the conveyor belt with respect to the forming drum because that positioning operation does not have to take into consideration any potential dimensional variations of the conveyor belt in the portions which are not involved with the elongated elements which are subsequently supported thereon in order to be supplied to the forming drum.

Furthermore, this method may advantageously also be applied to the supply of elongated elements which do not have to be cut in the region of the conveyor belt at which the first portion is defined or which are cut on the basis of a different control system.

The present invention, in at least one of the above-mentioned aspects thereof, may have at least one of the preferred features set out below.

Preferably, said control unit is provided to drive the loading of said elongated element on said conveyor belt when said first portion is at said loading region, positioning a front end of said elongated element on said first portion.

In this manner, it is possible to detect with precision the position of the elongated element at any desired location of the advance travel of the conveyor belt without any need to use parallel conveyor belts. As a result of this possibility, the elongated element may be cut to a desired measurement.

In a preferred embodiment, said supply device comprises a cutting member which is arranged to cut said elongated element to a predefined measurement.

In this manner, the supply device is capable of cutting an elongated element to a predefined measurement in order to deposit it on the forming drum at the desired length.

Preferably, said cutting member is positioned at the loading region.

Preferably, said sensor is arranged to detect the position of said front end of said elongated element on said first portion at a predetermined distance from said cutting member.

Preferably, said cutting member is driven by said control unit in order to cut said elongated element in accordance with the position on said first portion of said front end of said elongated element as detected by said sensor.

In this manner, the sensor may be positioned at a distance from the cutting member which is slightly less than the minimum length at which it has to be cut so that the advance of the conveyor belt after the detection of the position of the front end is as small as possible so as to minimize any errors of movement of the conveyor belt.

Preferably, said at least one first detection element has an extent in said supply direction which is less than 10%, and in a greatly preferred manner less than 5%, of the extent in said supply direction of said at least one conveyor belt.

Preferably, said at least one first detection element has an extent in said supply direction which is between 50 and 300 mm, in a greatly preferred manner of 100 mm.

In this manner, the first portion has a limited longitudinal extent, so that the portion of conveyor belt on which the elongated element is supported is substantially always the same.

Furthermore, a limited longitudinal extent allows, in some embodiments of the detection element, the characteristics of mechanical resistance of the conveyor belt not to be impaired.

In a preferred embodiment of the invention, there is provided on a second portion of said at least one conveyor belt, the second portion being distinct and separate from said first portion, at least one second detection element which is provided to cooperate with said sensor or with an auxiliary sensor in order to detect the presence of a terminal end of said elongated element.

In this manner, it is also possible to detect with precision the terminal end of the elongated element and therefore to calculate the length of the elongated element which results from the cutting operation and which is supplied to the forming drum.

Preferably, said at least one second detection element is provided to cooperate with an auxiliary sensor which is positioned at said loading region.

In this manner, in order to detect the terminal end it is not necessary to wait for the passage of the second portion in the region of a sensor which in general may be positioned at a given distance from the loading region, and this advantageously allows both the length of the conveyor belt and the supply cycle times to be contained.

Preferably, said at least one second detection element has an extent in said supply direction which is between 300 and 700 mm.

Preferably, said at least one first detection element or said at least one second detection element is positioned at a longitudinal axis of said at least one conveyor belt.

In this manner, each conveyor belt, if not provided with a second detection element, can be mounted in one direction or the other and, in the case of supply devices comprising a plurality of parallel belts, each belt can be mounted at any position, without any need for the provision of a stock of belts corresponding to each type of positioning.

In a preferred alternative version, said at least one first detection element or said at least one second detection element is positioned in a staggered position with respect to a longitudinal axis of said at least one conveyor belt.

In this manner, the present invention may also be applied to conveyor belts which are engaged in a guide by a protruding projection, which extends along the longitudinal axis of the belt at the side opposite the support surface of the elongated element.

In an embodiment, there are provided on said first portion a plurality of first detection elements.

In a greatly preferred manner, said plurality of first detection elements are provided symmetrically with respect to a longitudinal axis of said at least one conveyor belt.

Similarly, it is preferable for there to be provided on said second portion a plurality of second detection elements.

It is further preferable for said plurality of second detection elements to be provided symmetrically with respect to a longitudinal axis of said at least one conveyor belt.

As a result of this feature, the present invention may also be applied to conveyor belts which are engaged in a guide by a protruding projection, which also extends along the longitudinal axis of the belt at the side opposite the support surface of the elongated element in the presence of a plurality (first and/or second) of detection elements.

In a preferred embodiment, said sensor is of the optical type and comprises a light radiation detector.

In a first embodiment, said at least one first detection element or said at least one second detection element comprises a light radiation emitter.

In this case, there is provision for the light radiation to be incorporated in the conveyor belt and to be emitted in the region of the first portion thereof.

In an alternative embodiment, said sensor comprises a light radiation emitter which is separate and independent with respect to said conveyor belt.

Preferably, said light radiation emitter and said light radiation detector are arranged at the same side of said at least one conveyor belt and said at least one first detection element or said at least one second detection element comprises a reflection element for said light radiation.

In this manner, it is not necessary to have to position the light radiation emitter and the corresponding detector at opposite sides of the conveyor belt, obtaining simpler control of the sensor.

Preferably, said at least one first detection element or said at least one second detection element comprises a groove which has a closed contour and which is formed in said at least one conveyor belt in said supply direction.

In this manner, any reflection element or the light radiation emitter can be received in the conveyor belt in a protected position without being involved in the direct contact with the elongated element which could cause undesirable wear phenomena.

In a preferred alternative version of the invention, said at least one first detection element or said at least one second detection element comprises a through-opening which has a closed contour and which is formed in said at least one conveyor belt in said supply direction.

As a result of this feature, there is obtained a plant solution which is very simple and inexpensive. Furthermore, that solution can also be readily implemented in existing building plants with a simple modification of the conveyor belt. Preferably, said light radiation emitter and said light radiation detector are arranged at the same side of said at least one conveyor belt and, at the opposite side to said at least one conveyor belt, there is provided a reflection element which is provided to reflect the light radiation emitted by said light radiation emitter towards said light radiation detector when in alignment with said opening.

Preferably, said opening or said groove has a width between 5 mm and 30 mm, in a greatly preferred manner of 10 mm.

In this manner, there is ensured an adequate passage for the light radiation without impairing the characteristics of mechanical resistance of the conveyor belt.

In a preferred embodiment of the invention, the detection of the position of said first portion with respect to said supply device comprises:
  recording, by means of said sensor, a signal corresponding to the arrival of said at least one first detection element at a detection zone which is controlled by said sensor, attributing to the recording of said signal the position of said first portion in said detection zone.

Preferably, the duration of the detection of said signal is compared with a minimum duration value and the position of said first portion is attributed to the recording of said signal if said duration is greater than said minimum value.

In this manner, there are avoided false signal detections which may be attributed to the presence in the detection zone of regions of the conveyor belt different from the first or, where applicable, the second detection element. In particular, some conveyor belts being closed in a ring-like manner by means of a zip type closure, it is possible for the light radiation to be able to pass through that closure (or to reflect it), generating false signals of duration which is very limited, however.

In a preferred embodiment of the invention, said first portion is brought at said loading region and said elongated element is loaded on said at least one conveyor belt, positioning said front end on said first portion.

In this manner, the reference distance predefined by the loading region to which the first portion is brought after having loaded the elongated element is substantially zero, and the front end of the elongated element is positioned precisely thereon.

Preferably, there is further detected the position of said front end of said elongated element on said first portion with respect to said supply device.

Furthermore, the position of said front end of said elongated element is preferably detected by means of the mutual interaction between said at least one first detection element and said sensor.

Preferably, the detection of the position of said front end of said elongated element on said first portion with respect to said supply device comprises:
  recording the start of the detection by means of said sensor of a signal corresponding to the arrival of said at least one first detection element at a detection zone controlled by said sensor,
  recording the end of the detection by means of said sensor of said signal,
  comparing the duration of the detection of said signal with a maximum duration value and, if said duration is less than said maximum value, attributing to said end of the detection of said signal the position of said front end of said elongated element in said detection zone.

As a result of this feature, the position of the front end of the elongated element is established at a precise time.

Furthermore, by fixing a maximum duration value, it is possible to cause that maximum value to correspond to the duration of the passage of the first detection element in the detection zone, thereby preventing the end of the detection from being attributed to the position of the front end even in the absence of an elongated element on the first portion.

Preferably, the position of said front end of the elongated element is attributed to said end of the detection of said signal if said duration is less than said maximum value and greater than a minimum value.

Also in that case, there is avoided the possibility referred to above of involving false detections of the position of the front end of the elongated element as a result of the presence in the conveyor belt of limited regions which allow the passage or reflection of light radiation.

Preferably, said elongated element is cut to a predefined measurement before being deposited on said forming drum.

In a greatly preferred manner, said elongated element is cut to said predefined measurement by a cutting member which is provided at said loading region.

Preferably, said at least one conveyor belt is moved in said supply direction in order to move said front end of said elongated element away from said cutting member. Preferably, the position of said front end of said elongated element on said first portion is detected by said sensor at a distance from said cutting member less than said predefined measurement, to which said elongated element has to be cut.

Preferably, once said position of said front end is detected, said at least one conveyor belt is moved in said supply direction by a length equal to the difference between said predefined measurement and said distance and said elongated element is cut by said cutting member so as to obtain an elongated element which is cut precisely.

In this manner, the advance of the conveyor belt following the detection of the position of the front end is as small as possible, minimizing any errors of movement.

In a preferred version of the invention, said at least one first detection element comprises a through-opening which has a closed contour and which is formed in said at least one conveyor belt in said supply direction and when said opening is at said detection zone said sensor detects a light radiation which passes from one side to the other of said conveyor belt.

Preferably, a terminal end of said elongated element is positioned on a second portion of said at least one conveyor belt, which second portion is distinct and separate from said first portion, with which there is fixedly associated at least a 25 second detection element.

Preferably, there is detected the position of said terminal end of said elongated element on said second portion with respect to said supply device by means of the mutual interaction between said at least one second detection element and said sensor.

Preferably, there is alternatively detected the position of said terminal end of said elongated element on said second portion with respect to said supply device by means of the mutual interaction between said at least one second detection element and an auxiliary sensor which is positioned at said loading region in a fixed and independent manner from said conveyor belt.

In the first case, it is possible to detect both the front end and the terminal end of the elongated element with the same sensor, while in the second case, by arranging an auxiliary sensor in a suitable manner, it is possible to use a conveyor belt having a shorter length and to maintain reduced cycle times.

BRIEF DESCRIPTION OF THE DRAWINGS

The features and advantages of the invention will be better appreciated from the detailed description of a preferred embodiment thereof, which is illustrated by way of non-limiting example with reference to the appended drawings, in which.

DETAILED DESCRIPTION OF THE INVENTION

With reference to the appended Figures, there is generally designated 1 a tyre building plant which is produced in accordance with the present invention.

The plant 1 comprises at least one building station in which an elongate element 3 is distributed on the radially external surface of a forming drum 4, or a component of the tyre which is provided thereon.

Preferably, the plant 1 comprises a plurality of building stations, which are arranged in a position adjacent to each other so that the forming drum can be readily moved therebetween in accordance with a predefined order, which is defined by the succession of the elongated elements which have to be deposited thereon in order to form the tyre to be built.

The forming drum 4 has a generally cylindrical formation and is advantageously mounted on a motorized support unit (not illustrated in the appended Figures) which provides for it to be rotated about its own axis Z and to be moved between one building station and another.

Each building station further comprises a supply device 10 which is provided to supply the elongated element 3 towards the forming drum 4 and to deposit it on the radially external surface presented thereby.

The elongated element 3 extends in a prevailing longitudinal direction between a front end 5 and a terminal end 6 and can be constituted by any tyre component in accordance with the type of tyre to be built in the plant 1. For example, it may be formed by a ply of the carcass, by a belt strip, by a layer of liner or complex (a multi-layered structure comprising a liner, sub-liner, anti-abrasive) or by a sidewall insert or a sidewall (the sidewalls generally being supplied in pairs).

The elongated element 3 can therefore be formed by a continuous strip of elastomer material which is provided with reinforcement cords or only by elastomer material and/or any other reinforcement element which is advantageous for building a tyre, as known in the relevant technical field.

The supply device 10 comprises at least one conveyor belt 11 which is mounted on a frame 11a and which extends in a supply direction X between a loading region 12, in which the elongated element 3 is loaded on the conveyor belt 11, and an unloading region 13, in which the elongated element 3 is unloaded from the conveyor belt 11.

Figure 1:
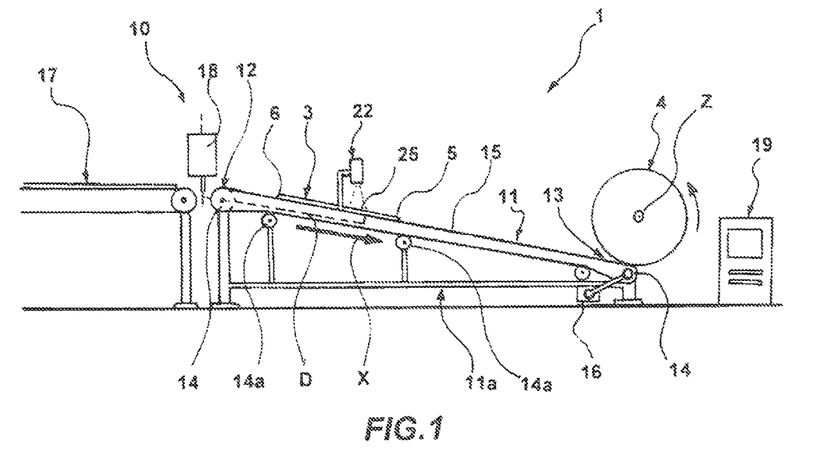
FIG. 1 is a schematic side view of a tyre building plant which is produced in accordance with the present invention.
Figure 2:
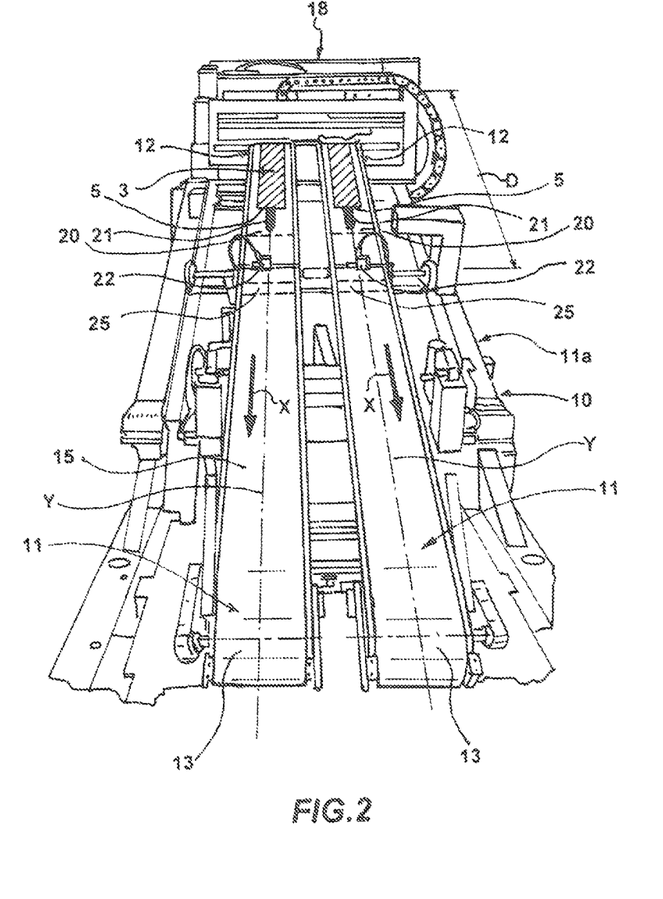
FIG. 2 is a schematic front view of a supply device of the building plant of FIG. 1.
Figure 3:
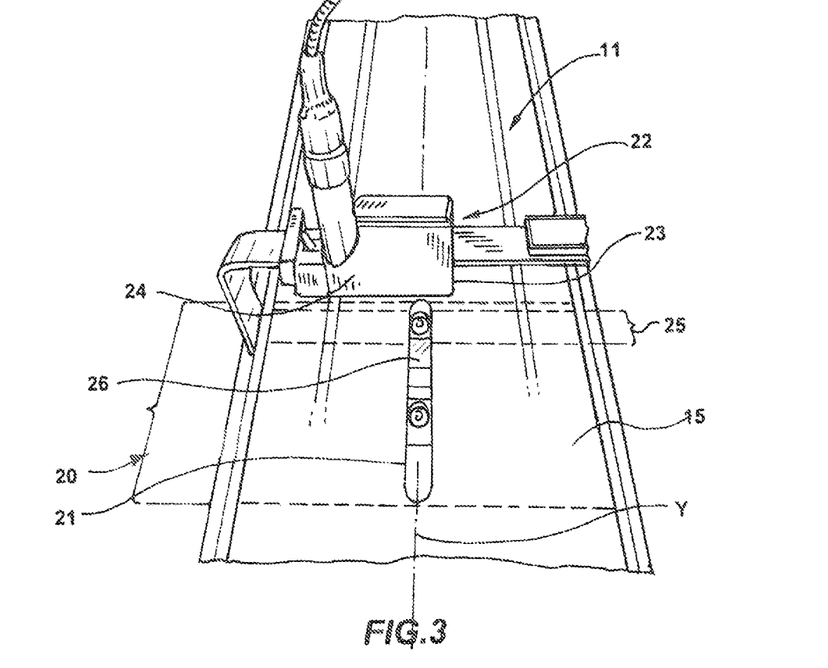
FIG. 3 is a view, drawn to an enlarged scale, of a portion of the supply device of FIG. 2.

In the preferred embodiment described here with reference to FIGS. 1 to 3, the supply device 10 is configured to supply to the forming drum 4 a pair of elongated elements which are intended to formed the sidewall inserts of a tyre and therefore comprises a pair of conveyor belts 11, which are substantially identical to each other and which are arranged in a parallel manner.

There will be described in detail below a single conveyor belt, but it is to be understood that the same characteristics are also intended to be referred to the other conveyor belt of the pair, and may be referred to supply devices which provide for a single conveyor belt.

Preferably, the loading region 12 and the unloading region 13 correspond to the longitudinal ends of the conveyor belt 11. Furthermore, the unloading region 13 is positioned in the vicinity of the surface of the forming drum 4, at a predefined distance, so as to promote the depositing of the elongated element 3 thereon.

The conveyor belt 11 is closed in a ring-like manner about rollers 14 which are rotatably supported on the frame 11*a*, so that there remains identified on the conveyor belt 11 a support surface 15 which is directed upwards, and on which the elongated element 3 is positioned.

The conveyor belt 11 is caused to rotate about the rollers 14 by a drive member 16 so that the support surface 15 thereof is moved from the loading region 12 to the unloading region 13 in the supply direction X.

Additional tension rollers 14*a* are further mounted on the frame 11*a* in order to abut the conveyor belt 11 and to tension it in an adjustable manner to the degree of tension which is most suitable.

In the preferred embodiment described here, the supply device 10 further comprises an additional conveyor belt 17 which is positioned upstream of the conveyor belt 11 and which is provided to take the elongated element 3, for example, from a reel where the elongated element is stored in a continuous manner, and to bring it towards the loading region 12 of the conveyor belt 11.

The supply device 10 further comprises a cutting member 18 which is positioned at the loading region 12 of the conveyor belt 11, preferably between a terminal end of the additional conveyor belt 17 and the conveyor belt 11, and which is provided to cut the elongated element 3 at a predefined measurement. Each cutting operation carried out by the cutting member 18 defines the terminal end 6 of an elongated element 3 which is already substantially loaded on the conveyor belt 11 and the front end 5 of the successive elongated element 3.

The supply device 10 further comprises a control unit 19 which is provided inter alia to control the movement of the conveyor belt 11, the movement of the additional conveyor belt 17 and the cutting member 18.

In particular, the control unit 19 is provided to move the conveyor belts 11 and 17 so as to load the elongated element 3 on the conveyor belt 11 when a specific first portion 20 of the conveyor belt 11 is located at a predefined reference distance from the loading region 12.

In the preferred embodiment described here, the elongated element 3 is loaded on the conveyor belt 11 when the first portion 20 is located at the loading region 12, that is to say, when the above-mentioned reference distance is substantially zero, so that the front end 5 of the elongated element 3 is precisely positioned on the first portion 20.

The first portion 20 of the conveyor belt 11 is defined by a first detection element which is fixedly associated therewith.

There is further mounted on the frame 11*a*, in a fixed position independent with respect to the conveyor belt 11, a sensor 22 which is provided to detect, by means of an interaction with the first detection element, the position of the first portion 20 and/or the position of the front end 5 of the elongated element 3 which may be positioned on the first portion 20 with respect to the supply device 10.

In the preferred embodiment described here, the first detection element is formed by a through-opening 21 which has a closed contour and which is formed in the conveyor belt 11 and which extends in the supply direction X.

The opening 21 is positioned in the region of a longitudinal axis Y of the conveyor belt 11 and has an extent in the supply direction X which is limited with respect to the extent of the conveyor belt 11, having, for example, a length between 50 mm and 300 mm, preferably of 100 mm, and a width measured in a direction perpendicular to the supply direction X of between 5 mm and 30 mm, preferably of 10 mm.

Preferably, the opening 21 has an extent in the supply direction X which is less than 10% and preferably less than 5%, of the extent of the conveyor belt 11, which, in the embodiment illustrated here, has an extent in the supply direction of approximately 2.5 m.

The sensor 22 is of the optical type and comprises a light radiation detector 23 and a light radiation emitter 24 which are arranged at the same side with respect to the conveyor belt 11 in a direction substantially perpendicular to the support surface 15 and in the region of the longitudinal axis thereof. In particular, the light radiation detector 23 and the light radiation emitter 24 are positioned at the side of the support surface 15, above the conveyor belt 11, while at the opposite side to the support surface 15, under the conveyor belt 11, there is positioned a reflection element 26.

The mutual positioning of the light radiation emitter 24 and the light radiation detector 23, on the one hand, and the reflection element 26, on the other hand, defines a detection zone 25 which is involved in the control of the sensor 22 and through which the conveyor belt 11 is driven during its advance in the supply direction X. In particular, during the passage of the first portion 20 in the region of the detection zone 25, the radiation emitted by the light radiation emitter 24 passes through the opening 21 and is reflected by the reflection element 26 so that, by again passing through the opening 21, it can be detected by the light radiation detector 23. The passage of the light radiation is instead prevented when the conveyor belt 11 or the elongated element 3 is interposed between the light radiation emitter 24 and the reflection element 26.

The sensor 22 is positioned in the vicinity of the conveyor belt 11 in such a manner that the detection zone 25 is at a distance D (measured parallel with the supply direction X) from the cutting ember 18, which is advantageously selected so as to be slightly less (for example, from 100 to 200 mm) than the minimum length at which the elongated element 3 can be cut.

In construction variants which are not illustrated, the light radiation emitter 24 and the light radiation detector 23 are independently arranged at opposite sides with respect to the conveyor belt 11 in a direction which is substantially perpendicular to the support surface 15 and in the region of the longitudinal axis thereof. For example, the light radiation detector 23 can be positioned at the side of the support surface 15, above the conveyor belt 11, while the light radiation emitter 24 can be positioned at the side opposite the support surface 15, under the conveyor belt 11. In this case, it is not necessary to provide a reflection element.

In another construction variant which is not illustrated, the reflection element can be positioned directly on the support surface 15 or, more preferably, at the bottom of a groove which is formed in the conveyor belt and which has a closed contour and a lowered profile with respect to the support surface 15.

In a further construction variant which is not illustrated, the light radiation emitter can be incorporated in the first detection element which is positioned, for example, at the bottom of a groove having a closed contour and a lowered profile with respect to the support surface formed in the conveyor belt.

In the cases set out above, the groove could have dimensions of length and width similar to those set out above for the opening 21.

The building plant 1 operates in accordance with the following.

The elongated element 3 is moved by the additional conveyor belt 17 towards the conveyor belt 11 so as to bring the front end 5 in the region of the loading region 12.

When the control unit 19 establishes, as explained in detail above, that the first portion 20 of the conveyor belt 11 is in the region of the loading region 12, the additional conveyor belt 17 is moved so as to transfer the elongated element 3 onto the support surface 15 of the conveyor belt 11. The additional conveyor belt 17 and the conveyor belt 11 are moved at the same speed, so as not to bring about undesirable sliding actions of the elongated element 3 with respect to the conveyor belt 11.

In this manner, the front end 5 becomes located on the first portion 20, partially covering the opening 21.

Following the advance movement of the conveyor belt 11 in the supply direction X, the first portion 20 arrives in the region of the detection zone 25 which is defined by the sensor 22, where the light radiation emitted by the emitter 24 can pass through the opening 21, be reflected by the reflection element 26 and then be detected by the detector 23, generating a corresponding signal.

The sensor 22 and/or the control unit 19 to which it is connected records that signal so as to establish the start and the end (and consequently the duration) of the detection of the light radiation carried out by the detector 23.

The end of the detection of the light radiation can be established by the discharge of the opening 21 from the detection zone 25 or, if an elongated element 3 is positioned on the opening 21, by the arrival in the detection zone 25 of the front end 5 of that elongated element 3.

The start of the detection of the signal is attributed by the control unit 19 to the arrival of the opening 21 (and therefore of the first portion 20) in the region of the detection zone 25. In this manner, the control unit 19 is capable of establishing with precision the position of the first portion 20 with respect to a fixed reference of the supply device 10 and, by knowing the length of the conveyor belt and the distance of the sensor 22 from the loading region 12, it is capable of calculating the movement of the conveyor belt 11 necessary to bring the first portion 20 into the region of the loading region 12 or, in the more general case, to bring the first portion 20 to any predefined reference distance from the loading region 12.

Preferably, the position of the first portion 20 is attributed, as described above, after the control unit 19 has subsequently compared the duration of the detection of the signal with a minimum duration value, so as to prevent possible false detections of signals which can be attributed to the presence in the detection zone of an optional zip type closure of the conveyor belt 11.

The end of the detection of the signal is attributed by the control unit 19 to the arrival in the detection zone 25 of the front end 5 of the elongated element 3. In this manner, the control unit 19 is capable of establishing with precision the position of the front end 5 of the elongated element 3 with respect to a fixed reference of the supply device 10.

Therefore, by knowing the predefined measurement at which the elongated element 3 has to be cut and the distance D between the detection zone 25 and the cutting member 18, the control unit 19 is capable of calculating (by subtracting the distance D from the predefined measurement) the movement of the conveyor belt 11 necessary for bringing the front end 5 to a distance from the cutting member 18 corresponding to that predefined measurement.

Preferably, the position of the front end 5 is attributed, as described above, after the control unit 19 has subsequently also compared the duration of the detection of the signal, in addition to a comparison with a minimum value as explained above, with a maximum duration value, so that the end of the opening 21 is not incorrectly mistaken for the arrival of the front end 5.

The conveyor belt 11 is then moved in the supply direction X away from the cutting member 18, by a length equal to the difference between that predefined measurement and the distance D and, at that location, the elongated element 3 is cut by the cutting member 18 at the instruction of the control unit 19.

The conveyor belt 11 is then further moved in order to advance the elongated element 3 which is now cut to the predefined measurement in the supply direction X as far as the loading region 13 where it is deposited in the region of the forming drum 4.

The conveyor belt 11 is then further caused to rotate about the rollers 14 until the first portion 20 is brought into the region of the loading region 12, on the basis of the movement calculated previously by the control unit 19.

At this point, there may be positioned on the first portion 20 the front end of a successive elongated element.

Figure 4:
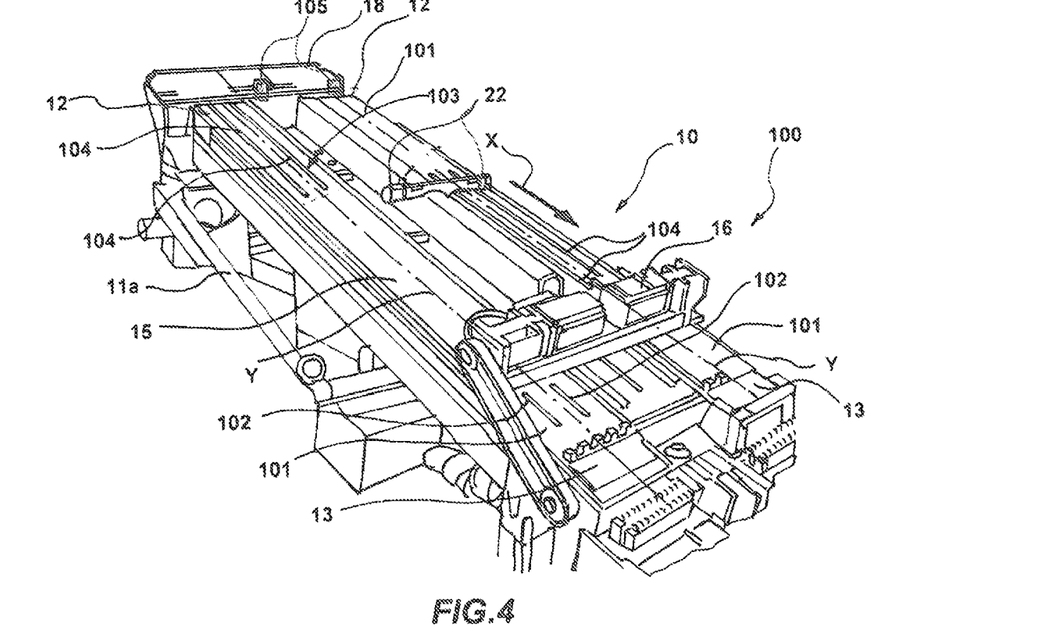
FIG. 4 is a view of a construction variant of the supply device of FIG. 2.

In FIG. 4, there is generally designated 100 a second embodiment of the building plant according to the invention wherein similar elements with respect to the building plant 1 are indicated using the same reference numeral.

The building plant 100 differs from the building plant of the preceding example as a result of a different configuration of the conveyor belt and the first detection element.

In particular, the building plant 100 comprises a pair of conveyor belts 101, which are configured identically and each of which comprises a protruding projection at the opposite side to the support surface 15 over a predefined measurement and extends along the longitudinal axis Y over the entire extent of the conveyor belt 101.

The projection is engaged in a sliding manner in suitable guides which are formed on the frame 11a so as to allow a more coherent advance in the supply direction X, limiting any lateral deviations of the conveyor belt.

In order not to interrupt the continuity of the projection, on the conveyor belt 101 there is provided a pair of first detection elements which are formed by respective openings 102, which are provided in a staggered position with respect to the longitudinal axis Y.

Preferably, the openings 102 have similar dimensions with respect to the opening 21 of the plant 1, and are arranged in a symmetrical position with respect to the longitudinal axis Y, parallel therewith.

Naturally, in this embodiment there is provision for the sensor 22 to comprise a pair of elements for detecting light radiation, a corresponding pair of light radiation emitters and a corresponding pair of reflection elements.

There is further defined on each conveyor belt 101 a second portion 103 which is separate and distinct from the first portion 20 and which is identified by a second detection element which is fixedly associated with the second portion 103 and provided to cooperate with an auxiliary sensor 105, which is mounted in the region of the loading region 12 in order to detect the presence of the terminal end 6 of the elongated element 3.

The second detection element has an extent in the supply direction which is generally greater than the first detection element because it has to be able to detect the position of the terminal end 6 of elongated elements which can generally have measurements which are different from each other in accordance with the tyre to be built on the forming drum 4.

Preferably, the second detection element has an extent in the supply direction X of from 300 to 700 mm.

The second detection element is advantageously constructed in a manner similar to the first detection element, also in accordance with the configuration of the sensor 22, so that, on the conveyor belt 101, there is provided a pair of openings 104 which are arranged symmetrically with respect to the longitudinal axis Y in alignment with the openings 102.

The functionality of the plant 100 is similar to that of the plant 1, with the additional characteristic, afforded by the provision of the second detection element, of being able to control the position of the terminal end 6 and consequently being able to establish the length of the elongated element 3 which is cut by the cutting member 18.

Naturally, a person skilled in the art could apply additional modifications and variants to the invention described above for the purpose of complying with specific and contingent application requirements, variants and modifications in any case being included within the scope of protection as defined by the appended claims.

The invention claimed is:

1. A method for supplying an elongated element by a supply device with at least one conveyor belt to a forming drum in a tyre building plant, comprising:
    fixedly associating at least one first detection element with a first portion of said at least one conveyor belt, wherein said at least one conveyor belt moves in a supply direction and said at least one first detection element comprises a through-opening which has a closed contour and which is formed in said at least one conveyor belt in said supply direction;
    positioning, at a loading region of said supply device, a front end of said elongated element at a predefined reference distance from said first portion;
    detecting a position of said first portion with respect to said supply device at a detection zone through a mutual interaction between said at least one first detection element and a sensor, which is positioned on said supply device fixedly and independently with respect to said conveyor belt;
    calculating, in accordance with the detected position of said first portion, the movement of said at least one conveyor belt which is necessary to bring said first portion to said reference distance from said loading region;
    advancing said at least one conveyor belt toward an unloading region of said supply device until said elongated element is deposited at said forming drum;
    bringing, in accordance with the calculated movement, said first portion of said at least one conveyor belt to said reference distance from said loading region; and
    positioning a front end of a successive elongated element on said conveyor belt.

2. The method according to claim 1, wherein detection of the position of said first portion with respect to said supply device comprises:
    recording, by said sensor, a signal corresponding to an arrival of said at least one first detection element at said detection zone which is controlled by said sensor; and
    attributing to the recording of said signal the position of said first portion in said detection zone.

3. The method according to claim 2, wherein duration of the detection of said signal is compared with a minimum duration value and the position of said first portion is attributed to recording of said signal if said duration is greater than said minimum value.

4. The method according to claim 1, wherein said first portion is brought at said loading region and said elongated element is loaded on said at least one conveyor belt, positioning said front end on said first portion.

5. The method according to claim 4, further comprising detecting the position of said front end of said elongated element on said first portion with respect to said supply device.

6. The method according to claim 5, wherein the position of said front end of said elongated element is detected through a mutual interaction between said at least one first detection element and said sensor.

7. The method according to claim 6, wherein the detection of the position of said front end of said elongated element on said first portion with respect to said supply device comprises:
    recording the start of the detection by said sensor of a signal corresponding to arrival of said at least one first detection element at said detection zone controlled by said sensor;
    recording an end of the detection by said sensor of said signal; and
    comparing duration of the detection of said signal with a maximum duration value and, if said duration is less than said maximum value, attributing to said end of the detection of said signal the position of said front end of said elongated element in said detection zone.

8. The method according to claim 7, wherein the position of said front end of the elongated element is attributed to said end of the detection of said signal if said duration is less than said maximum value and greater than a minimum value.

9. The method according to claim 1, wherein said elongated element is cut to a predefined measurement before being deposited on said forming drum.

10. The method according to claim 9, wherein said elongated element is cut to said predefined measurement by a cutting member which is provided at said loading region, and said at least one conveyor belt is moved in said supply direction in order to move said front end of said elongated element away from said cutting member.

11. The method according to claim 10, wherein the position of said front end of said elongated element on said first portion is detected by said sensor at a distance from said cutting member less than said predefined measurement, to which said elongated element has to be cut.

12. The method according to claim 11, wherein, once said position of said front end is detected, said at least one conveyor belt is moved in said supply direction by a length equal to a difference between said predefined measurement and said distance, and said elongated element is cut by said cutting member so as to obtain an elongated element which is cut precisely.

13. The method according to claim 1, wherein said at least one first detection element has an extent, in said supply direction, less than 10% of an extent, in said supply direction, of said at least one conveyor belt.

14. The method according to claim 1, wherein when said opening is at said detection zone said sensor detects a light radiation which passes from one side to another of said conveyor belt.

15. The method according to claim 1, wherein a terminal end of said elongated element is positioned on a second portion of said at least one conveyor belt, which second portion is distinct and separate from said first portion, with which there is fixedly associated at least a second detection element.

16. The method according to claim 15, comprising detecting the position of said terminal end of said elongated element on said second portion with respect to said supply device through the mutual interaction between said at least one second detection element and said sensor.

17. The method according to claim 15, comprising detecting the position of said terminal end of said elongated element on said second portion with respect to said supply device through a mutual interaction between said at least one second detection element and an auxiliary sensor which is positioned at said loading region in a fixed and independent manner from said conveyor belt.

* * * * *